United States Patent
Keene et al.

(10) Patent No.: US 7,634,455 B1
(45) Date of Patent: *Dec. 15, 2009

(54) METHOD AND APPARATUS FOR PROVIDING CONTROLLED ACCESS TO SOFTWARE OBJECTS AND ASSOCIATED DOCUMENTS

(75) Inventors: Catherine M. Keene, San Jose, CA (US); Raymond Lin, San Jose, CA (US); Rao Sadhureddy, Bangalore (IN)

(73) Assignee: Agile Software Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/401,251

(22) Filed: Sep. 23, 1999

(51) Int. Cl.
G06F 7/00 (2006.01)

(52) U.S. Cl. .............. 707/2; 707/1; 707/9; 707/10; 707/104.1; 726/2; 726/26; 726/27

(58) Field of Classification Search ............... 707/2, 707/100, 102, 9, 10, 201, 203
See application file for complete search history.

(56) References Cited

U.S. PATENT DOCUMENTS

| | | | |
|---|---|---|---|
| 5,317,729 A * | 5/1994 | Mukherjee et al. ............. 707/3 |
| 5,434,791 A * | 7/1995 | Koko et al. .................. 700/97 |
| 5,689,638 A | 11/1997 | Sadovsky | |
| 5,864,853 A | 1/1999 | Kimura et al. | |
| 6,052,688 A | 4/2000 | Thorsen | |
| 6,085,191 A | 7/2000 | Fisher et al. | |
| 6,314,409 B2 * | 11/2001 | Schneck et al. ............... 705/54 |
| 6,381,579 B1 * | 4/2002 | Gervais et al. ................. 705/8 |
| 6,453,353 B1 * | 9/2002 | Win et al. .................... 709/229 |
| 7,401,082 B2 | 7/2008 | Keene et al. | |

FOREIGN PATENT DOCUMENTS

WO      WO 9514266 A      5/1995
WO      WO9514266 A *      5/1995

OTHER PUBLICATIONS

International Search Report for PCT/US00/26195 dated Nov. 3, 2000.
Non-Final Office Action for U.S. Appl. No. 10/660,296, mailed on Jul. 9, 2004, pp. 21.
Final Office Action for U.S. Appl. No. 10/660,296, mailed on Mar. 14, 2005, pp. 26.

(Continued)

*Primary Examiner*—Hung Q Pham
(74) *Attorney, Agent, or Firm*—Townsend and Townsend and Crew LLP

(57) ABSTRACT

A method and device such as a database for storing and providing controlled access to objects and associated documents by multiple users according to predetermined privileges set by the owner, or host, of the stored information. Individual users, or guests, can be given access to the objects, its attributes and associated documents as determined by the host of the information. The host of the information can set up access privileges based on any type of relationship. This is particularly useful in complex business relationships between a host and a plurality of users, both of which may be sensitive about their trade secrets and other confidential information.

21 Claims, 9 Drawing Sheets

OTHER PUBLICATIONS

Non-Final Office Action for U.S. Appl. No. 10/660,296, mailed on Dec. 9, 2005, pp. 30.
Final Office Action for U.S. Appl. No. 10/660,296, mailed on Jul. 27, 2006, pp. 20.
Notice of Allowance for U.S. Appl. No. 10/660,296, mailed on May 24, 2007 pp. 6.
Notice of Allowance for U.S. Appl. No. 10/660,296, mailed on Mar. 19, 2008 pp. 8.
"Microsoft Press," Microsoft Press Computer Dictionary, Third Edition, 1997, p. 72.
"Microsoft Press," Microsoft Press Computer Dictionary, Third Edition, 1997, p. 156.

* cited by examiner

METHOD AND APPARATUS FOR PROVIDING CONTROLLED ACCESS TO SOFTWARE OBJECTS AND ASSOCIATED DOCUMENTS

BACKGROUND

The invention generally relates to methods and systems for retaining software objects and associated documents and, more particularly, to a method and apparatus for providing controlled access to shared objects and documents in a database among approved users by individually defining the scope of their access to the data contained therein.

Most business entities have a perpetual need to exchange data among other business entities. Manufacturers, for example, have a constant need to interchange their product data among their business partners in order to keep production flowing efficiently. As business arrangements become more complex, it becomes important to carefully organize data that is shared among business partners. This becomes important as manufacturers are now outsourcing more and more products, further depending on outside business partners.

To complicate matters further, these business partners often exchange information electronically on different and incompatible formats. As a result, many businesses resolve this problem by actually exchanging paper documents among themselves. This of course seems absurd in light of modern day advancements in computer technology. However, most businesses that focus on producing products will not easily change their business practices at the administration level in fear of inhibiting their product flow. In order to gain acceptance by businessmen, any new method of exchanging data needs to be simple, easy to implement and virtually error free.

One approach is to employ an electronic data interchange ("EDI"). An EDI is typically established between two businesses or entities to securely exchange data. The problem with this method is that it is limited to two parties. This is not helpful for diverse business relationships having multiple partners. This makes it difficult to share information, especially when multiple partners contribute information among a complex supply chain of component parts. In the end, the host of the information being used in the supply chain must dictate how the information is distributed by establishing certain business relationships. For example, an original equipment manufacturer (OEM) can contract to a multitude of contract equipment manufacturing (CEM) companies which collaborate to develop a product, subcontracting component parts to different companies. These relationships can form a complex chain of business agreements that require information to be passed among the companies according to the individual agreements. Typically, the OEM governs how the business chain is set up among the multiple partners and dictates how information is passed among the business partners. It can also be the case, however, that information emanates from another part of the supply chain, such as a CEM, which may develop a component part, the design of which other partners depend upon for their development. In such situations, information pertaining to the product and its individual parts must flow among the partners in a tightly regulated manner, limiting access to certain confidential information to particular partners. Accomplishing this electronically is very difficult, since the individual partners must exchange information among themselves while maintaining each other's trade secrets and confidential information.

Therefore, there is a need for a method and apparatus that can centralize information, maintain trade secrets and confidentiality among business partners and allow access to certain information according to established business relationships in an organized and useful manner. Such a product would obviate the need for complex individual agreements between business partners that prescribe the sharing of trade secrets and confidential information. As discussed below, the invention accomplishes this is a unique and elegant manner.

SUMMARY OF THE INVENTION

The invention provides a database system for storing and providing controlled access to objects and associated documents by multiple users according to predetermined privileges set by the owner, or host, of the stored information. Individual users, or guests, can be given access to the objects, its attributes and associated documents as determined by the host of the information. The host of the information can set up access privileges based on any type of relationship. This is particularly useful in complex business relationships between a host and a plurality of users, both of which may be sensitive about their trade secrets and other confidential information.

In operation, after given an access identification, a user can access the database system and request access to an object. The system then retrieves information pertaining to the individual user's privilege criteria and determines which information contained in the database may be accessed by the requestor. The system then filters the information including objects, their attributes and associated documents according to the privilege information and gives the user limited access to the information. The requested and approved information can then be sent to the requestor of the information. This could also be displayed to the user as a document file having a redacted document, blocking out the information that the user is not privileged to see.

Access to objects and associated documents can also be limited to read-only privileges. It can be limited even further to read-only privileges to particular objects, their attributes, associated documents and other information. Privileges could be limited to viewing the object itself, to viewing only certain attributes of an object and to view only certain attached documents. Privileges could also be expanded to modification privileges. With modification privileges, a user can modify the data to which it has access by either adding or deleting information and attaching or removing other documents associated with the objects. This enables a type of data exchange between the host and other privileged users.

DETAILED DESCRIPTION OF THE INVENTION

The invention is directed to a system and method for retaining information in the form of objects and documents in a database and for providing controlled access to the information by multiple users according to predetermined privileges set by the owner of the information, or host. Examples are described below that pertain to the exchange of information while producing a component part for a manufacturer. It will be appreciated, however, that this is illustrative of only one utility of the invention, and that the invention has greater applicability. Unlike devices in the prior art, the invention allows access by multiple users, or guests, of individual objects and associated documents stored in the system. Also unlike the prior art, the invention provides the ability to control the access by particular users according to predetermined privilege criteria, including reading and modifying information. This criteria can be set according to one or a number of business agreements among business partners for handling privileged and confidential information during the course of business. The invention is particularly useful in helping entities such as original equipment manufacturers (OEMs) and contract equipment manufacturers (CEMs) share information when producing products and component parts throughout a product supply chain.

Figure 1:
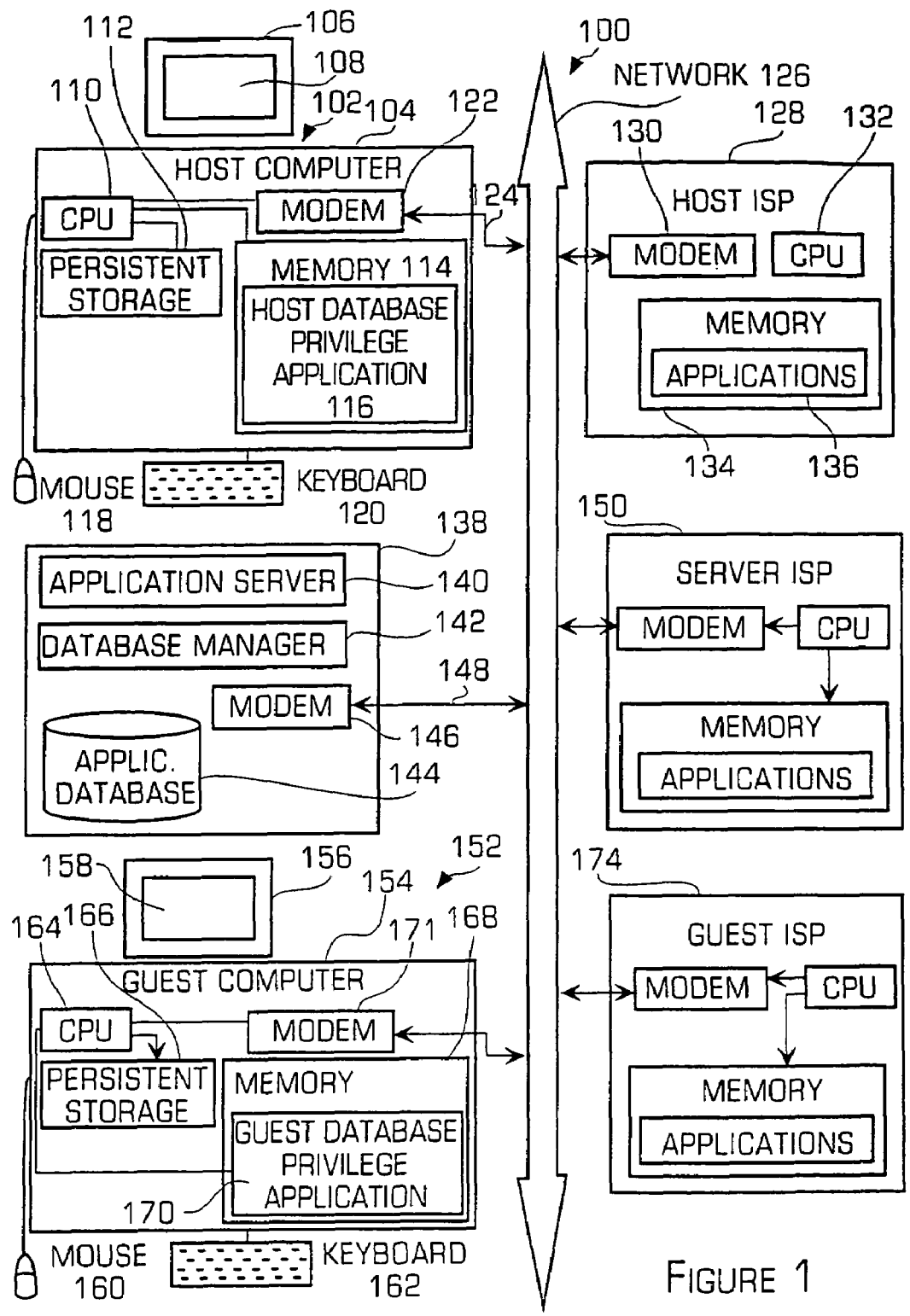
FIG. 1 is a block diagram of a system for providing storage and controlled access to information in accordance with the invention.

Referring to FIG. 1, the invention provides a information management system 100 for use over a network 126 so that information can be transferred among multiple users. The system 100 includes a host system 102 having a host computer 104 for processing digital data information. The host system 102 further includes a monitor 106 having a graphical user interface (GUI) 108 to display information. Computer 104 includes a CPU 110 for receiving and processing information received by host system 102 and processed within the host computer 104. The CPU is connected to persistent storage 112, such as random access memory (RAM), dynamic read only memory (DRAM), static read only memory (SRAM) and other types of memory devices, which may store one or more software applications that may be loaded into memory 114 and executed by the CPU. The host computer further includes a host database privilege application 116 stored in memory 114 and configured to establish and manage a host database account containing host information. This is discussed in further detail below.

The host computer 104 may be any one of a number of personal computers configured to execute software code. It can be operated by a user via mouse 118 manipulating a cursor (not shown) and a keyboard 120 for inputting data. The host computer further includes a modem 122 connected via a communication link 124 to network 126 for communication among other network numbers. Communication link 124 can be any one of a number of communication links including a telephone line, wireless communication device or a common networked computer system. Network 126 may be any one of a number of network systems including a telephone system, a cellular network system or a local area network (LAN) system for exchanging and transferring information.

The host system may be affiliated with a host internet service provider (ISP) that communicates with network 126 for sending and receiving information via the Internet. Host ISP 128 further includes a modem for transferring information between the network 126 and Host ISP 128. CPU 132 controls the functions within the host ISP by executing software applications 136 stored in memory 134. Primarily, the purpose of the host ISP is to allow the host computer 104 to communicate via the Internet with other computers.

A information retention system 138, also connected to network 126, is configured to retain and store objects and associated documents and information and provide controlled access to information by multiple users. It is accessible by users on the network system 126 that have access privileges. The information is stored in the application database 144 of the system may be organized by data objects that represent the information contained therein. For example, if a component part of a product is to be represented in the database, the object may be identified by the part number or other identification and could contain attributes that define or describe information relevant to the part. Generally, objects link together different types of information such as attributes and related documents. Objects can be of different types such as field types, which may describe an item such as a component part, links that associate an object with other objects or documents and other types that are helpful in describing or defining an object or related information. Objects may be organized in sets of objects that are related by common attributes or some other affiliation. If properly defined, objects can be very helpful in identifying related information in a logical manner. For example, a component part could have associated with it an object identifying the part, as well as other objects that describe the part in the context of the final product. The part could also have affiliated with it a bill of material (BOM), a change order, and other files relevant to the part or the final product.

According to the invention, each object may contain associated attributes that define or describe the object or the subject matter to which it pertains. Other attributes match or link other information to the object. For example, a component part may have associated with it a part object, a BOM, change orders, a text document, specification drawings, and other attributes. The part object could describe or define basic characteristics of the part such as part number, color, size, type, etc. A BOM could describe different fields that a typical bill of materials may have such as price, quantity, find number, cross references etc. The BOM may also include links to other objects that pertain to related information relevant to the individual information fields within the BOM. Change orders can include any proposed changes to earlier versions of the part and may even include a history of changes. A text document may be attached to the object to include any textual materials relevant to the part or its manufacture. A graphics drawing could also be included with the part object to provide graphical representations of the part, the final product, or any other useful visual aide. Other attributes may be included in the object to help provide information relevant to the part. The invention allows controlled access to theses objects and their related attributes by guest users having certain privileges. Different levels of access may be established for a given user according to a host's predetermined criteria. An object could even be made invisible to a guest user. Furthermore, a host may allow a guest user to access and modify any of these objects or related attributes according to the specified privilege criteria set up by the host.

The retention system includes an application server 140 for processing information and maintaining objects and associated documents within the system. The retention system further includes a database manager 142 configured to control application database 144. The application data base contains objects and associated documents to be accessed by users connected to network 126. The system further includes a modem 146 to connect the system with network 126 via communication link 148, similar to the communication link 124 discussed above.

ISP 150 communicates with network 126 and performs similar functions as the host ISP 128 discussed above. In fact, it could very well be the same ISP utilized by the host, serving multiple users on network 126. The purpose of the ISP is to allow the transfer of information between the retention system 138 and users having access to the Internet.

System 100 further includes guest system 152. The guest computer system includes at least one guest computer 154 and a monitor 156 having a GUI 158 for viewing information. Guest computer 154 also includes a mouse 160 and a keyboard 162, both for inputting data from a user. The guest computer further includes a CPU 164 for controlling internal functions of the guest computer. The CPU is connected to persistent storage 166 for storing computer programs to be executed by the CPU. The guest computer further includes memory 168 having a guest database privilege application 170 configured to access information stored in retention system 138 when the computer program code is executed by the CPU 164. The guest computer further includes a modem 171 for communicating with network 126 via a communication link 172 similar to communication links 124, 148 discussed above. System 100 further includes guest ISP 174 communicating with network 126 to provide ISP services to guest computer system 152 similar to ISPs 128, 150 discussed above.

In accordance with the invention, system 100 operates to provide information stored in retention system 138 to be accessed by multiple users connected to Network 126. Host system 102 is an "owner" of the information stored in application data base 144 including the objects and their attributes, associated links to other objects and any attached or otherwise associated documents. It controls the access privilege criteria that allows a guest user operating guest system 152 to information owned by host system 102. For example, if the host system were an OEM, it would be a producer of products developed under certain product technical specifications, cost limitations and other product specifications. Typically, an OEM would have multiple CEMs providing component parts for the OEM's products. These CEMs would need certain information for producing their component parts, but would not need all of the information pertaining to the OEMs final product. The system 100 allows an OEM having a host system 102 to set up objects in application data base 144 located in the retention system 138. The OEM, now a host, can allow controlled access to a objects and associated documents pertaining to a product so that certain CEMs, now guests, to only see the information that they need to conduct business, not all the information pertaining to the OEM's product.

As a more specific example, if a computer manufacturer, an OEM and a host, were contracting with a keyboard manufacturer, a CEM and a guest, to build keyboards, it would want to limit the keyboard producer to information or specifications pertaining to the keyboard, e.g., its physical and electrical connection with the computer. The keyboard manufacturer would not necessarily need to know all of the information pertaining to other unrelated component parts, such as modems or memory. Furthermore, the computer manufacturer may also be contracting with other keyboard manufacturers to produce similar products having different specifications, prices, etc. The computer manufacturer would not want the first keyboard manufacturer to see pricing information and other information that may be sensitive to the OEM or to the keyboard manufacturer's competitors. In fact, it may not even want the competitors to know whether each other exists.

To this end, the invention provides for a method for the computer manufacturer to set up objects and associated documents pertaining to the computer product and to give its suppliers and component manufacturers access to the information they need, without giving them access to information that the computer manufacturer wants and may be required to keep confidential. All this, and system further allows easy transfer of the information through network 126.

Figure 2:
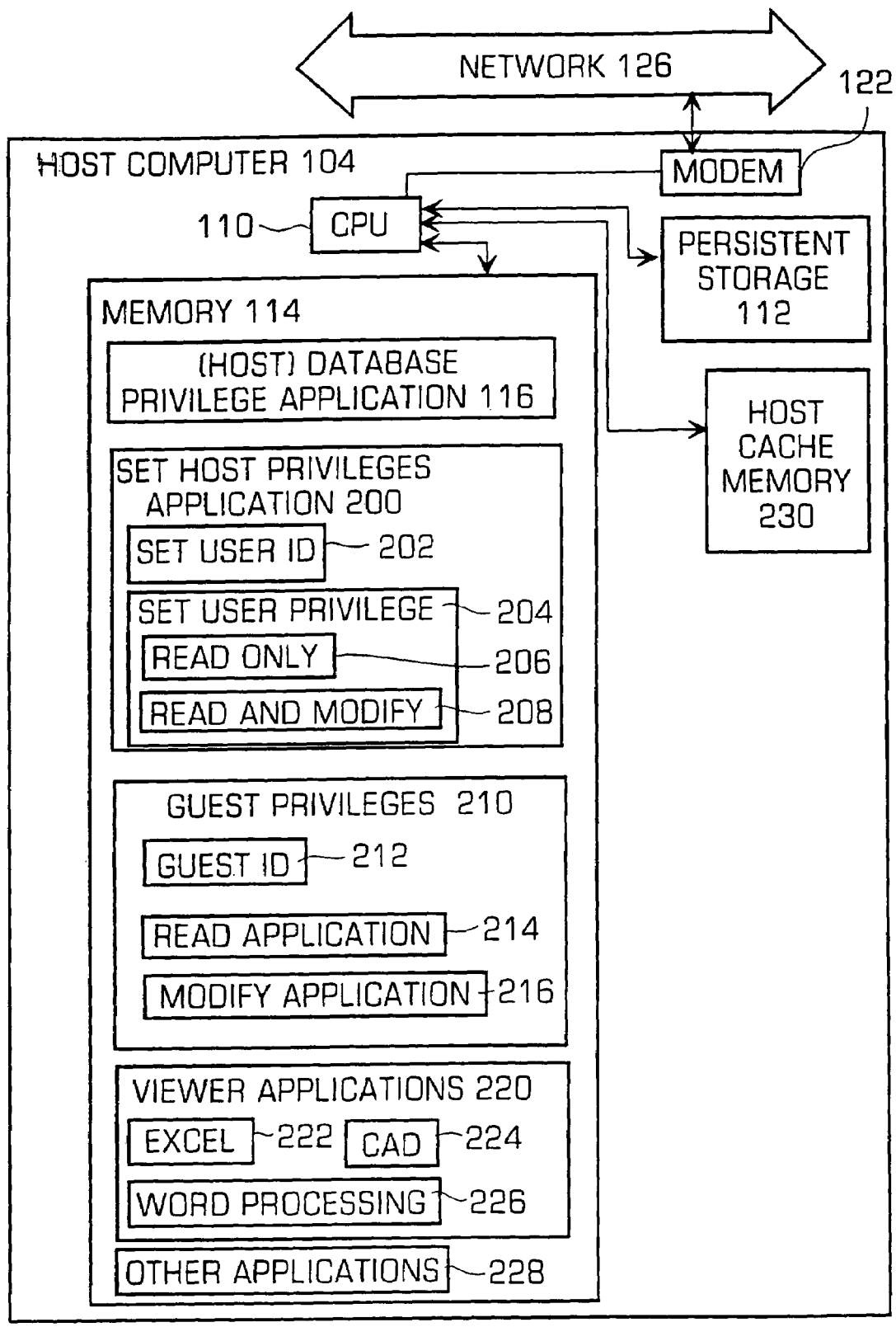
FIG. 2 is a block diagram of a host computer in accordance with the invention.

FIG. 2 illustrates a more detailed block diagram of host computer 102 from FIG. 1. Memory 114 contains the Host Data Base Privilege Application 116. Application 116 contains computer readable code which CPU 110 can execute when a host user is accessing objects and associated documents contained in the application data base 144 of the retention system 138. It also facilitates a host user in setting up objects having objects and associated documents in application data base 144 and establishing privilege criteria for guest users.

A set host privileges application 200 stored in the memory may contain code that is executable by CPU 110 for performing functions that allow a host user to establish an object or set of objects in application data base 144 and set privilege criteria for particular guest users. Within application 200 is set user identification (ID) code 202 that may allow a host user to identify a guest user to which it wishes to give access to the host's information. Set User Privilege code 204 is also included in application 200 for establishing the controls to which a host user wishes to impose upon a guest user in accessing the host's information. Within setting the user privilege, the set user privilege may include Read-Only code 206. This limits a guest user to read-only privileges on information including objects and associated documents. Without more, a user can only read an object to which it has access and not modify any information. Within the read-only code, a host user further has the ability to limit sections of data contained in the object. For example, in the computer manufacturer example above, the computer manufacturer may not want CEMs that are competing and producing similar products to see each other's pricing information. The computer manufacturer, the host, can set up each of the CEMs privilege criteria so that each CEM will only see its own pricing information and not other competitors pricing information. For example, a guest user could be viewing a BOM that is associated with the product that has attributes redacted that pertain to the pricing information of competitors. Thus, the controlled access to the object allows a host to arrange the supply of products from multiple vendors at different prices, to give them access to the document and to maintain the confidentiality of sensitive information.

Also within the set user privilege code is Read and Modify code 208. This gives the option for a host to give read access as discussed above and also allow a guest user to modify information, including objects, their attributes and associated documents, to which it has privileged access. This would establish a useful communication link between the host user and guest user and allow them to modify certain information pertaining to the product in question. Also, within the ability to modify, a host user can give a guest user the ability to add as well as delete information. This can be very useful as the development of a product proceeds and changes in product information and specifications are needed.

It is also conceivable that a host user may also act as a guest user in the normal course of business, where manufacturers may be buying products from each other. Each user would then want to set up their information including individual objects and associated documents, controlling access to guest users. Therefore, a guest privilege application 210 is included in the host computer 102 to give a host the ability to be a guest user. Included in the guest privileges code is a guest ID 212 that identifies the host user as a guest user when acting as a guest. Also included in the guest privileges code is read application code 214, which includes software code that allows a guest user to read an object or other information stored in application data base 144. The guest privileges code also includes modify application code 216 that gives the host user guest privileges to modify an object or other information owned by another host if the host computer 102 is given the appropriate guest privileges.

Host computer 102 also includes Host Viewer Application Code 220 stored in memory 114 that includes applications for viewing different attachments that may be attached to an object and stored in application data base 144. These applications may include a spreadsheet, for example Microsoft Excel™ 222, a computer automated design (CAD) application 224, such as Autocad™, for reading CAD drawings and a word processing application 226 for reading text from a document. Other applications 228 may also be stored in memory 114 for performing other functions.

In operation, host computer 102, under control of the CPU 110, loads one or more of the applications from memory 114 into host cache memory 230 and executes the code. Some of the application code may be stored in persistent storage 112, where such code is frequently used by the CPU 110. The CPU then executes the code to access objects and associated documents in a information retention system 138. Further details of the execution of the data base code is discussed below.

The Host Database Privilege Application 116 can be implemented using methods well known to those skilled in the art. The application is created using computer code that is executable by CPU 110. A host user can operate the host system 102, FIG. 1, by inputting data into the mouse 118 and keyboard 120 to engage the Host Database Privilege Application 116. A host user can access the internet with the computer 104 via modem 122. Using the internet service provider, the host user can access a website to set host privileges and to perform guest privileges when the host is acting as a guest accessing another host's object or associated document. Using the application programs stored in the memory 114, the host user can set a user ID when interfacing with the website by associating an electronic or digital identification with a user to identify it as a guest having access privileges to a host object or associated document.

As discussed in more detail below, host object contain attributes divided up into groups and having separate privileges associated with the individual objects and to documents associated with the objects. The host user can give access to a guest user by associating the guest user's ID with particular objects. Then, when the guest user accesses the object, it will have access to the attributes, associated documents and other data as defined by the host in association with the guest user's identification. The host user can further establish different levels of privilege to any particular guest user. For example, a host user can limit a guest user's access to merely reading an object or other information, not modifying. If it wishes, the host can further control the access of a guest user by allowing a user to modify the object or associated information by adding data. A guest user can further have privileges to delete data and also attach documents.

In another embodiment of the invention, a host can set the privileges of a guest user by establishing levels of access, sort of like security clearances for different levels of information and privilege. For example, a host could establish levels of access 1-10, where 1 is a low level of access and 10 is full access privileges including reading and modifying the entire object or set of objects. Level 1 could be read only access for certain information, perhaps even publicly available information. Level 1 could give insight into certain component parts and their specifications for access by certain vendors. Level 3 could be pricing information and Level 4 could include competitor rates. A host user could set it up so that a guest user that has access to level 3 also has level to all lower levels of privileged information. A host could also set the privileges so that each level 1-10 is a different combination and permutation of reading certain groups of data, adding data into certain groups and deleting data from certain groups as specifically defined by the host.

Figure 3:
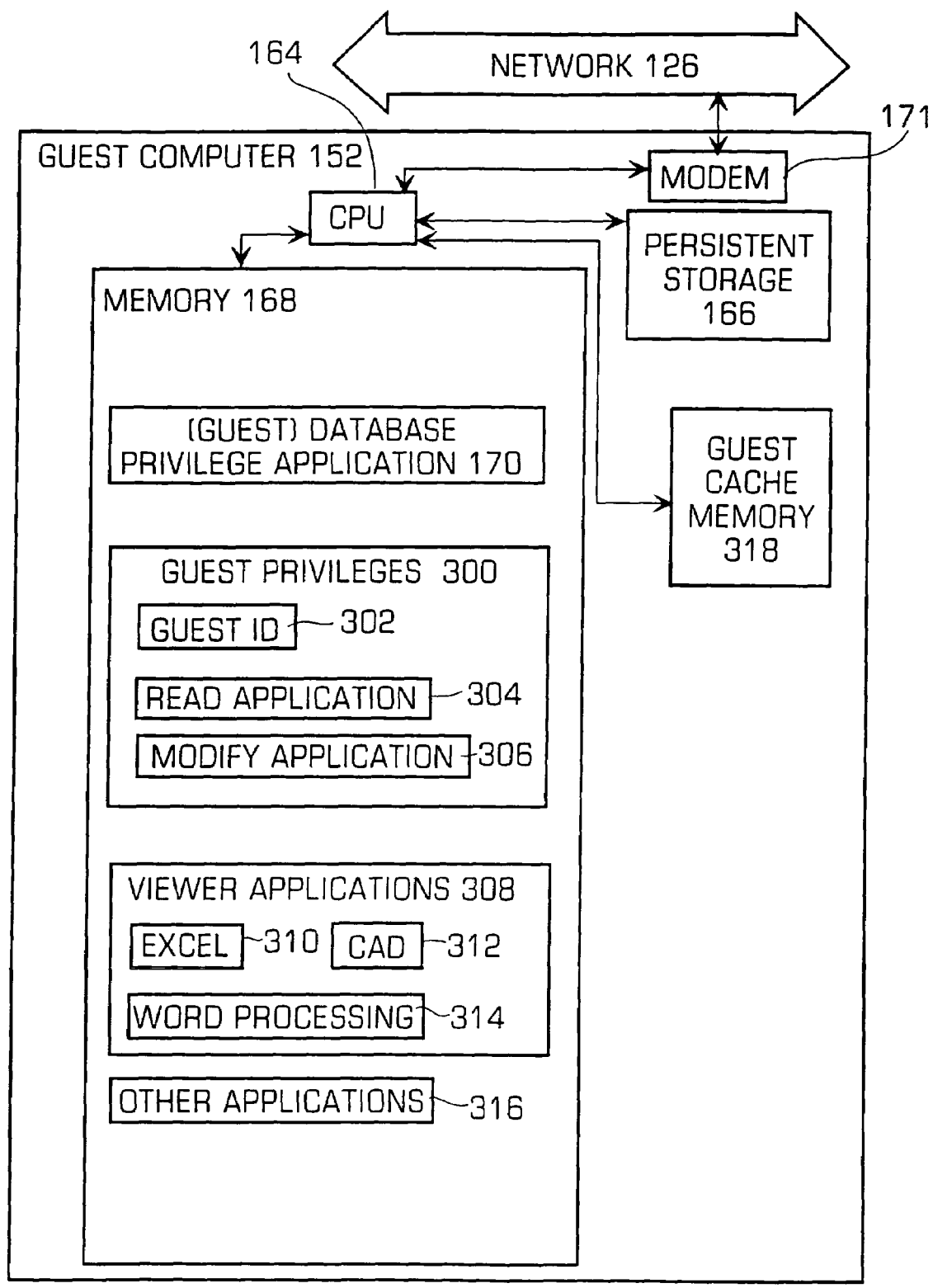
FIG. 3 is a block diagram of a guest computer in accordance with the invention.

FIG. 3 illustrates a guest computer 152 that may be operated by a guest user in accessing objects and associated documents in application data base 144. Guest computer 152 includes guest privileges code 300 may be similar to the host's guest privileges code 210 (FIG. 2). Guest privileges code 300 includes a Guest ID 302 that identifies the guest when attempting to access a host object stored in data base 144. Guest privileges code further includes read application code 304 and modify application 306, again, similar to the read application code 214 and modify application code 216 contained in host computer 104 (FIG. 2). The operation of guest privileges 300 is discussed in further detail below. Also included in guest computer 152 are viewer applications code 308 which may include a spreadsheet such as Excel™ 310, CAD 312 and word processing code 314. Again, these may be similar to the viewer applications found in the host computer 104 and may be implemented in ways well known to those skilled in the art. Other applications 316 that pertain to document access are also included in memory 168.

Still referring to FIG. 3, in operation, when a guest user wishes to access objects and associated documents located in application database 144, CPU 164 loads guest privileges code 300 into guest cache memory 318. The CPU then executes the code to gain privilege to the requested privileged information. Some of the code may also be stored in persistent storage 166 when it is frequently utilized. Guest computer 152 further includes modem 171 that communicates with network 126 to transfer information pertaining to accessing objects and associated documents in the retention system 138. Further operational details of the guest computer 152 are discussed below.

The Guest Database Privilege Application 170 can be implemented using methods well known to those skilled in the art. The application 170 is created using digital software code that is executable by the CPU 164. The CPU executes the Guest Database Privilege Application 170 in response to the guest user inputting data from the mouse 160 and the keyboard 162. As discussed above, the Guest ID code 302 is software code executable by the CPU to attach to a request an electronic or digital identification that identifies a guest user. The guest user will have an ID if it has been identified by a host to have privileges to access a certain objects. This guest ID is attached to a request sent by the guest user to the Information Retention System 138 and is extracted by the retention system to verify the guest user's privileges in viewing the requested information. The privileges are defined by the host in setting up the guest user's ID and are retrieved by the retention system when the request is received by the guest user. Once the guest user is verified, i.e., the guest user ID is matched with the proper privileges set by the host, the information associated with an object is made accessible to the guest user according to its privileges.

Once the Guest has access to an object, the Read Application Code 304 may be executed by the CPU to access the object to read its contents. Viewer Applications Code 308 can be used to view the contents of attached documents in the manner prescribed by the document application whether the document has text (word processing code 314), drawings (CAD code 312) or categorized information such as numbers for a spreadsheet (spreadsheet code 310). The same viewer applications may be used for modifying the document when using the modify code 306. The document may be modified using these applications. But, a guest user may be limited to viewing the document when the privileges to modify the document are defined by the host of the document. The privilege may be further defined to allow the guest user to change the document information by adding or deleting information.

Figure 4:
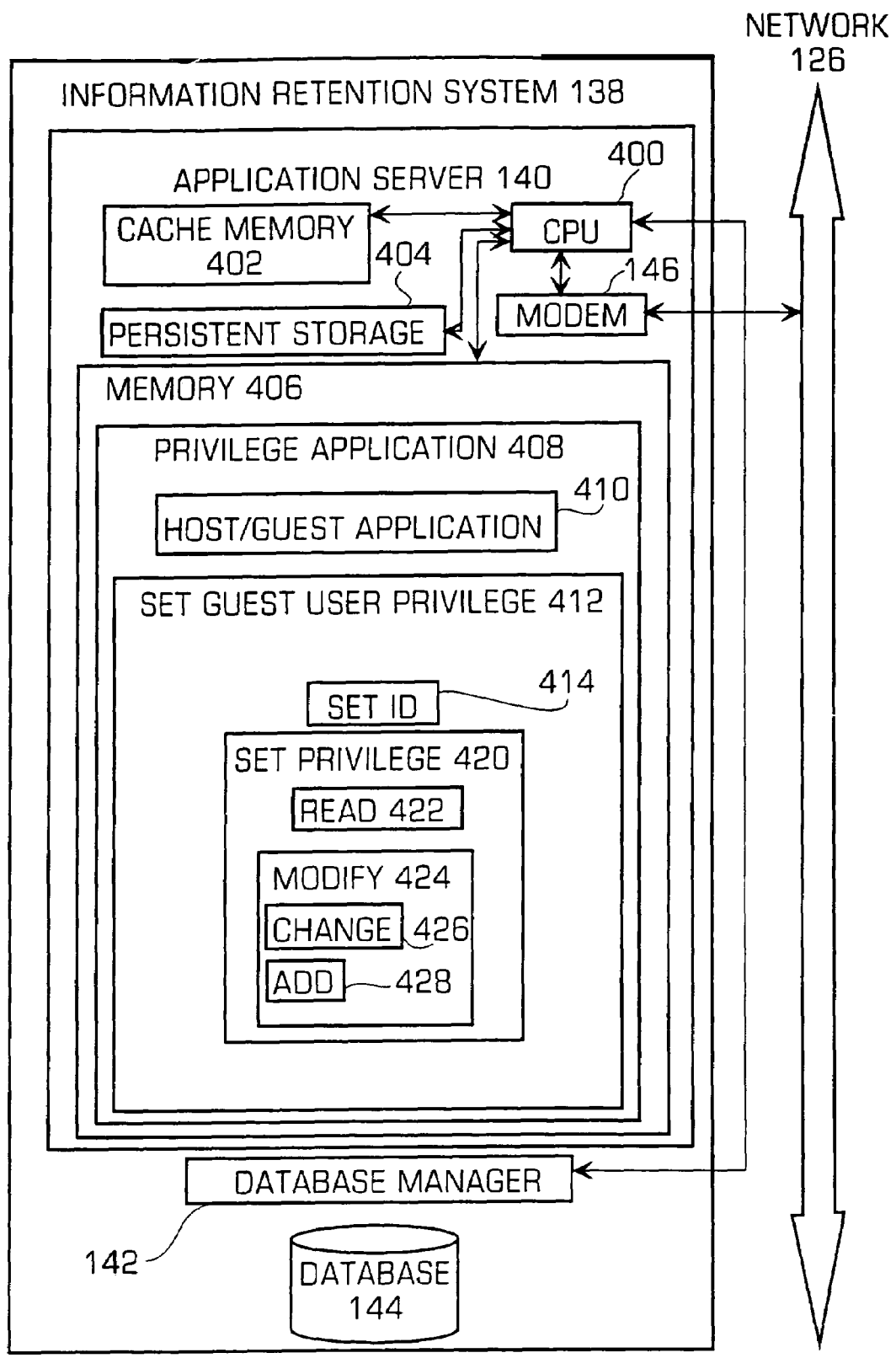
FIG. 4 is a block diagram of an Information Retention System in accordance with the invention.

FIG. 4 illustrates a Information Retention System 138 in accordance with the invention. The system includes an application server 140 connected to network 126 and configured to marshal information among the Information Retention System 138, host computer 104 and guest computer 154 via network 126. Application server 140 includes a CPU 400 for executing code stored in a memory 406 and for controlling the operations of an application server 140. The CPU is connected to a cache memory 402 for loading executable code from memory 406 to be later executed by the CPU. The server further may include persistent storage 404, similar to the persistent storage 112 discussed above, for storing certain application code that is frequently accessed by the CPU. Memory 406 contains privileged application code 408 that governs the establishment of the host/guest relationship using application code 410 and set Guest User Privilege Code 412. The Host/Guest Application Code 410 includes executable software code that governs the establishment of an object and any associated documents in database 114 as well as the actual access of objects and associated documents stored in files in database 144. When a guest user wishes to access an object or associated document in database 144, CPU 400 loads the host/guest application code into cache memory 402 and executes the code to begin the access process. Set User Privilege Code 412 is loaded into cache memory 402 and executed by the CPU when a host wishes to establish privilege criteria for a particular guest user. Included are Set ID code 414 for establishing identification of a guest user and Set Privilege Code 420 for establishing the privilege criteria. Establishing the privilege criteria includes Read Code 422 and Modify Code 424. The modify code includes code that allows a host user to establish whether a guest user can change 426 or add 428 information within an object loaded in database 144. Further details of the operation of the objects and the Information Retention System and the interaction with the host and guest computers is discussed in further detail below in connection with FIG. 8.

The privilege application 408 can be implemented using methods well known to those skilled in the art. The application is made up of digital software code that is executable by the CPU 400. When a request is received by a guest user or if other commands are received by a host to set up or modify an object and any documents and other information associated with the object, the CPU executes the proper code from the privilege application code 408 to perform the appropriate functions.

When a host user wishes to set up an object or set of objects and include any associated documents, it sends commands indicating as such using its Host Database Privilege Application 116 to the retention system 138. This is accomplished by the host user sending commands to the host computer 104 using the mouse and the keyboard, indicating that it wants to set up an object. The host computer then executes the Set Host Privilege Application 116 in the host CPU 110, which sends commands to the Information Retention System 138 to interpret the commands and to set up an object or other information in the retention system. The retention system then loads the privilege application 408 into the cache memory 402, and it is subsequently executed by the CPU in setting up the document. The Host/Guest Application 410 is loaded and executed when a host wants to set up an object or other information. The retention system sets up the document according to the host's document criteria, data and privilege information. As the host sends information for use in an object or other information, the retention system, in executing the Host Guest Application, organizes the information according to individual groups of data, of which privileges are attached. This information may include data that is organized in the document as well as attachments that could be included with the document. The privileges may also be attached to particular objects to blank-out the objects themselves from access, rendering them invisible to guest users without privileges to see them. When the user ID is set using the Set ID code 414, the privileges are also set for each user using the Set Privilege code 420. The privilege code is loaded into the retention system's cache for the CPU to execute and set privileges for a guest user or guest users according to the host's commands.

When a host user wants to set up a guest user ID, identifying a guest user to have access to an object or other information, the host user inputs data using the mouse and the keyboard, indicating that it wants to set up an object or other information. The host computer 104 then sends commands to the Information Retention System 138 by executing the Host Database Privilege Application code 116. In response, the retention system reads the commands and responds by executing the Privilege Application 408 with the CPU 400. If the host sends commands to set a guest ID, the Set ID code 414 is loaded into the cache memory 402 and executed by the CPU. This causes a guest ID to be assigned a host's object. Now, when a guest user sends a request for access to an object or other information, the system can look up the guest ID, determine the guest user's privileges to an object or other information, and give the approved access to the document according to the predetermined privileges.

When the host sends commands to the retention system to set privileges, the Set Privilege code 420 is sent to the cache and executed by the CPU, setting privileges according to the host's preferences in the received commands. If the host wishes the guest user to have read privileges, the Read code 422 is executed by the CPU to give the guest user read privileges in the document. If the read command is qualified, it would limit the guest user to reading only certain groups of data as defined by privileges. These individual privileges are established by identifying the groups of data, objects, associated objects or other information to be matched with a guest user, and storing a list of access codes for each group of information in memory and associating the list with the guest user ID. Each attachment may also have an access code identification associated with, giving the host the ability to control guest user access to the attachment. The list of codes include the guest user's ID and codes associated with the privileges that the guest has including read privileges, however qualified and modify privileges, whether add or delete, again, however qualified. These privileges may be in the form of electronic or digital identifications that distinguish among the individual groups of data. The ability to set privileges can be developed using software code that is executable by the CPU in a manner well known to those skilled in the art. On the guest user's list stored in memory, there may be a list of these privileges that define the groups to which the guest user has access. The list may further include identifications indicating the degree to which the guest user can access the individual group, such as reading the existing information and adding and deleting information.

Then, when the guest user sends a request for access to an object or other information, the retention system processes the request with the CPU by extracting the requestor's guest user ID from the request data stream. The retention system then loads the Host/Guest Application 410 into the cache memory 402 and executes it with the CPU 400. The guest user ID is then retrieved, verified (discussed below) and matched up with the predetermined privilege identifications stored in memory, either in main memory, cache memory, persistent storage, or another location. The retention system may then send a version of the requested object or associated information, which reveals information in which the guest user has privileged access. If the guest user has modification privileges, then the version of the requested object would include the ability to modify the information within the document accordingly.

Figure 5:
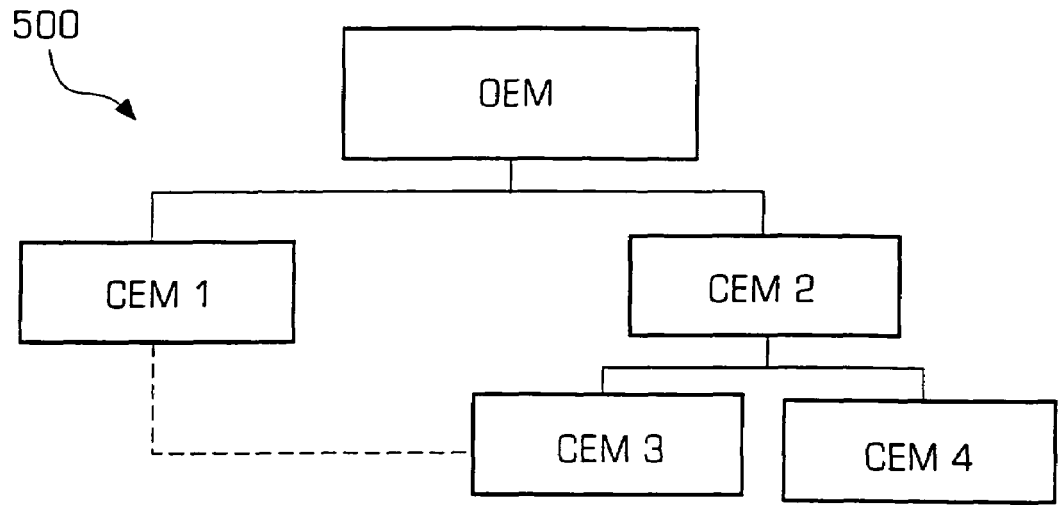
FIG. 5 is a block diagram illustrating the hierarchy of a business arrangement of the type with which the invention may be employed.

The system 100, FIG. 1, is configured to establish a hierarchy of access to documents owned by a host and to control access by guest users as defined by the criteria set up by the host. Referring to FIG. 5, a sample of a typical relationship among an OEM and a multitude of CEMs is illustrated. Referring again to the example of a computer manufacturer having multiple suppliers, the invention has a very useful application. In the example of FIG. 5, the OEM may be the computer manufacturer and CEMs 1-4 may be suppliers. CEM 1 may be a keyboard manufacturer and CEM 2 may be a competing keyboard manufacturer. CEM 2 receives component parts of the keyboard from competing suppliers CEM 3 and CEM 4. For this example, CEM 3 and CEM 4 may produce the internal electronic hardware used to transfer signals from the keyboard to the OEM's computer. Also for this example, CEM 1 may produce its own internal keyboard hardware, but may also outsource to CEM 3 to augment its supply. There are many confidential relationships in this example, which could be supported by software applications developed with the invention. CEM 1 and CEM 2 would not necessarily want to share their trade secrets and certainly would not want the exchange governed by OEM. Similarly, CEM 3 and CEM 4 would not want to share trade secrets and other confidential information pertaining to the products that they supply to CEM 2. Also, since CEM 3 supplies both CEM 1 and CEM 2, CEM 1 and CEM 2 would not want their trade secrets and confidential information leaking through CEM 3 or, for that matter, CEM 4. In fact, the OEM may not even want each of the CEMs to know that each other exists. This is known as the "Discovery Privilege," which is the ability to discover whether the information exists at all, let alone having any access to it. For example, the invention could be configured such that the CEMs are not identified, and that each CEM is able to access, view or otherwise, only the information that is relevant to the individual OEM-CEM relationships. Other information could be masked to hide the existence of product lines, geographical information, and any other information that a participant deems sensitive. As complicated as this example may seem, real life business arrangements can become even more complicated. However, utilizing the invention, one single document can be established that controls the access by the respective business partners to the information contained in the document.

In one embodiment, the OEM can establish an object stored in database 144 and set privilege access criteria for each of a plurality of third parties, such as its business partners. Of course, such criteria can be established by a consensus of the group of business partners. But, in the end, it is preferred that one business partner govern the access to the data stored in the database. As an alternative embodiment, the Information Retention System could act as an escrow to establish access criteria, such as an independent third party that acts under the direction of a consensus of business partners. The limits to which this application can be varied and applied to different situations are virtually limitless. They may only be limited to the possibilities established by the business agreements.

Figure 6:
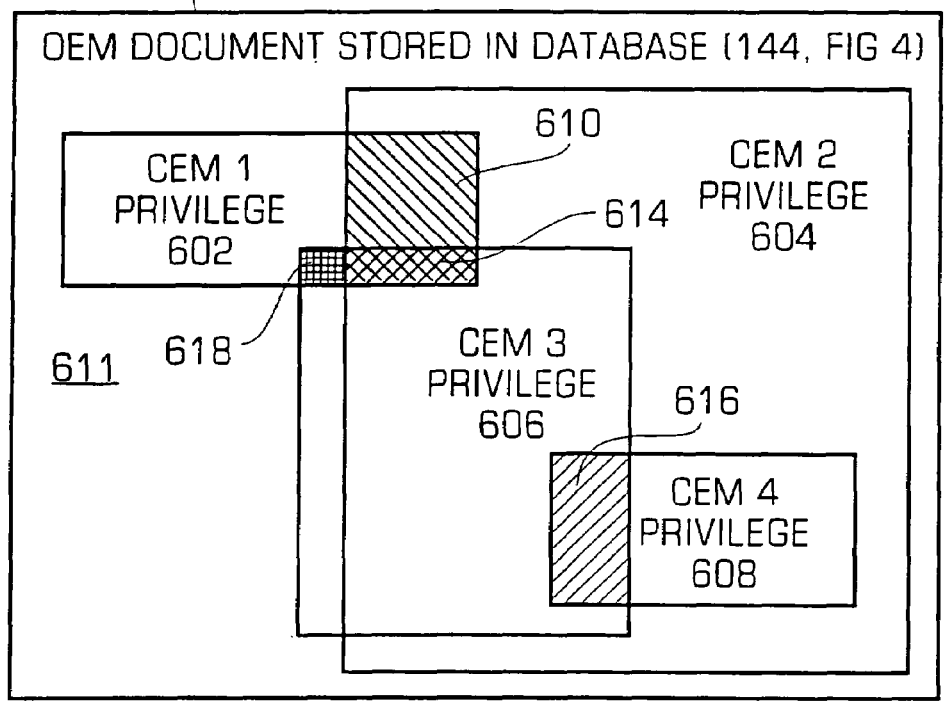
FIG. 6 is a VEN diagram illustrating an example of the different access privileges of business partners shown in FIG. 5 in accordance with the invention.

Referring to FIG. 6, a VEN diagram is shown to illustrate and example of the possibilities of shared access to a single object or set of objects and associated documents and information by the business partners show in the hierarchy of FIG. 5. The different shaded areas represent the individual portions or groups of information contained in or attached to the object and accessible by the individual business partners. The outer perimeter of the object 600 is the totality of information supplied by the OEM in establishing the document in database 144. Both CEM 1 and CEM 2 have separate privileges, 602, 604, respectively, which define their individual privileges to information in the total object. The common area 610 illustrates the information supplied by the OEM that is shared by both CEM 1 and CEM 2. Perhaps, in the keyboard example, this could represent the specifications of the actual keyboard that CEM 1 and CEM 2 would need to produce their component product. The information that is outside area 610 could represent other information pertaining to the business deals between the OEM and CEM 1 and CEM 2, respectively, such as cost, for example. FIG. 6 also illustrates in the abstract that CEM 1 and CEM 2 have access to less than all of OEM's product information 611. Within the CEM 2 privilege 604, supplier CEM 3 having privilege 606 and CEM 4 having privilege 608 are within the realm of the CEM 2 privilege 604. This is realistic since the OEM would probably want to limit the information that CEM 2 could pass on to its components suppliers, CEM 3 and CEM 4, who may be supplying the OEM's competitors. Area 616 illustrates the shared information between CEM 3 and CEM 4 much like the information shared between CEM 1 and CEM 2 is illustrated by area 610. Area 616 could represent the actual component parts specifications that would be needed by both CEM 3 and CEM 4 to produce the component part for CEM 2.

As discussed above, CEM 1 has a business relationship with CEM 3 for supplying component parts. As illustrated in FIG. 6, the hatched area 614 represents the information shared between CEM 1 and CEM 3 according to their respective privileges 602, 606. Also regarding the CEM 1 and CEM 3 relationship, shaded area 618 illustrates the information that is shared by CEM 1 and CEM 3, but not shared with CEM 2. This, perhaps, could represent the pricing information agreed between CEM 1 and CEM 3.

Figure 7A:
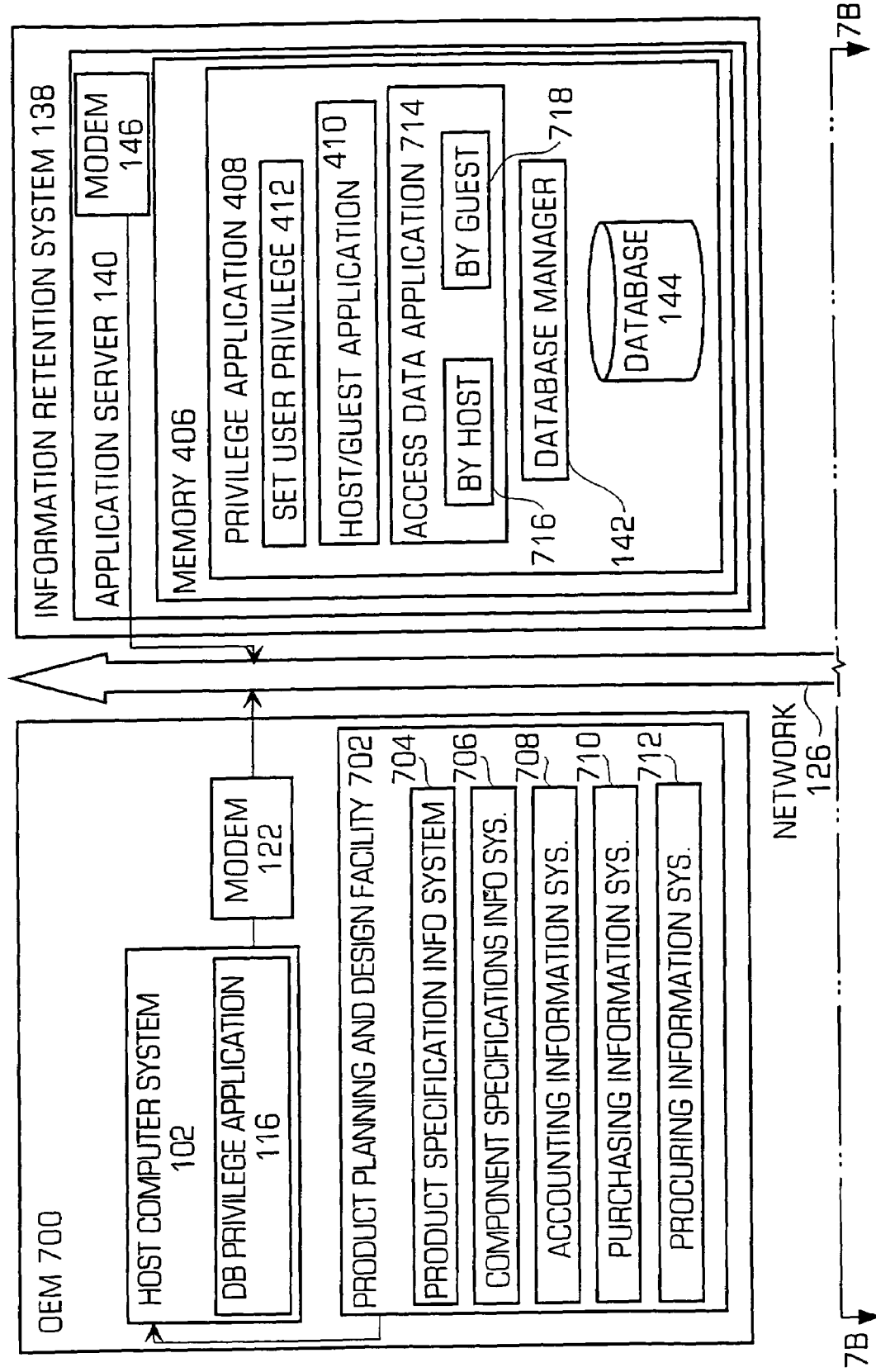
FIGS. 7A and 7B is a block diagram of a business system employing the invention.
Figure 7B:
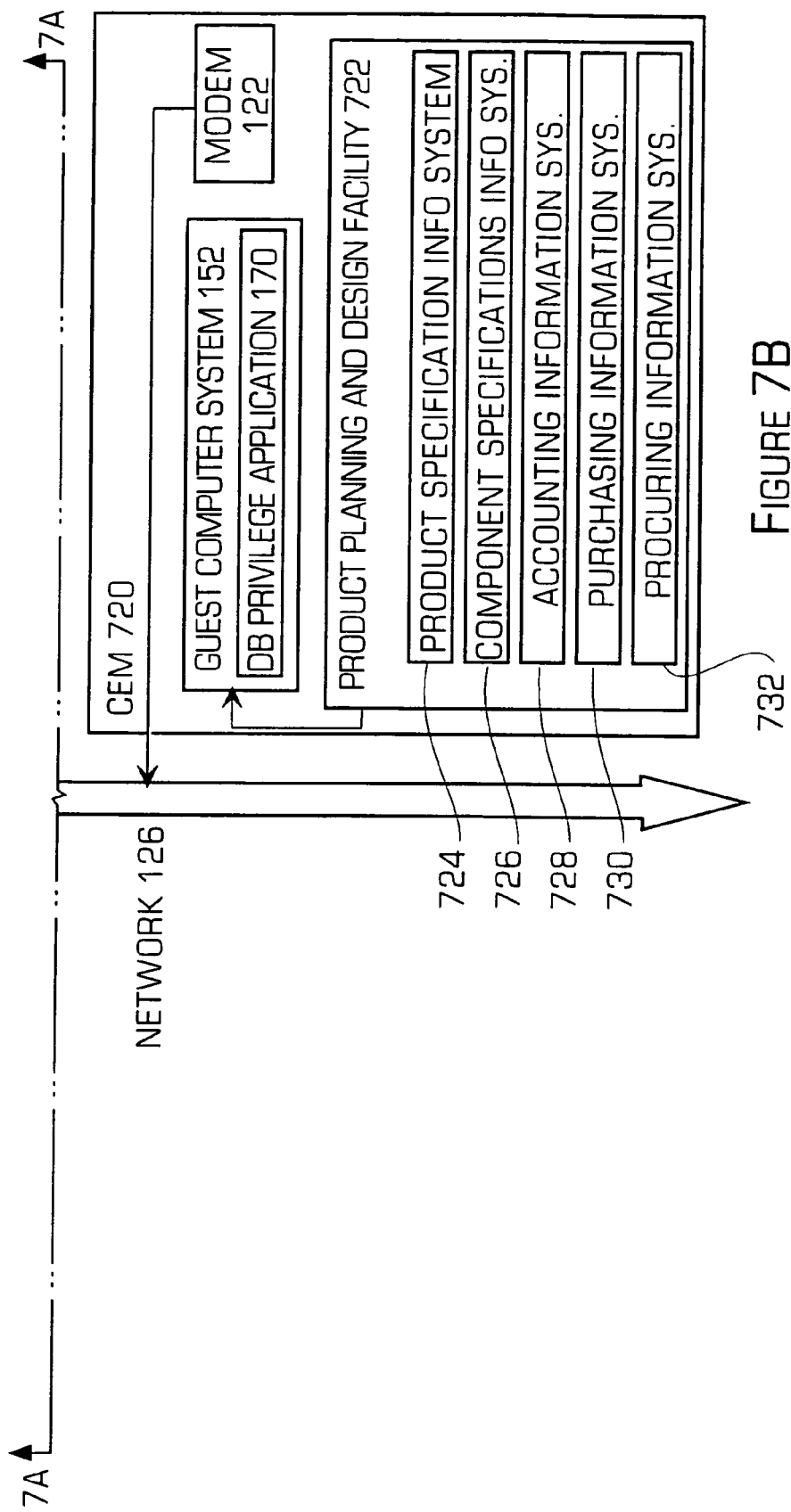

Referring to FIGS. 7A and 7B, a block diagram illustrating a business relationship between an OEM and a CEM is given. First, in FIG. 7A, an OEM 700 has employed a host computer system 102 such as that illustrated in FIG. 2. The computer system 102 has a Database Privilege Application 116 stored in its memory (not shown) for accessing data in Information Retention System 138. In the normal course of business, information pertaining to a product produced by OEM 700 originates at the producing planning and design facility 702. Within that facility, the product specification and Information System 704, where the product is developed, produces information pertaining to the product specifications. A component manufacturer would need this information to produce and supply component parts. Component specification and Information System 706 would provide a component part manufacturer with the information needed to produce the component parts. Accounting information system 708 would supply the economic data governing the cost parameters of any product or component part. Purchasing Information System 710 provides information further pertaining to the cost of producing and buying a part and other purchasing information. Procuring Information System 712 provides information pertaining to the procurement of certain parts such as the quantity of parts already received, the quantity needed and other projections that pertain to procuring products. This information is fed to the host computer system 102 and disseminated using the Database Privilege Application 116. An object can be stored and maintained in database 144, which organizes the information in a useful manner. Modem 122 is used by computer system 102 to communicate with the Information Retention System 138 via network 126.

Still referring to FIG. 7A, a Information Retention System 138 is shown having application server 140 with memory 406. Within the privilege application 408 is Access Data Application 714, which governs the access of objects and associated documents and information stored in database 144 and maintained by OEM 700 using host computer system 102. The applications of a host and guest, 716, 718 are separate and distinct primarily because of the privileges that each enjoy. The host, for example, has the full range of privileges to any object or associated document that it hosts or owns, allowing it to read, modify and change the document in any way. Furthermore, the host can establish and re-define privileges allowed to a guest in any of the host's objects. In contrast, the guest only has access capabilities 718 as defined by the host in setting up any particular object. Therefore, the access to an object or other information is much more restrictive of guests than it is of a host of the object.

Referring to FIG. 7B, CEM 720 employs guest computer system 152 as illustrated in FIG. 3, which contains database privilege application 170. Similar to the OEM 700 of FIG. 7A, the CEM 720 derives its information from its product planning and design facility 722 when developing a product or component products. The design facility includes a product specification information system 724 providing information pertaining to the specifications of products. Component specifications information system 726 provides information pertaining to any component part of a product, whether it is a product of the CEM 720 or of OEM 700. Accounting information system 728 provides information pertaining to the cost analysis of any product or component part. Purchasing information system 730 provides information regarding other economic data pertaining to a part, including the purchase cost of products, component parts and other materials. Procuring information system 732 provides information pertaining to the availability of parts, whether in-house or outside suppliers, as well as other parts needed for the manufacture of products and component parts. The information from design facility 722 is sent to the guest computer system 152 and ultimately to network 126 using modem 122 to transfer and receive information between the CEM 720 and Information Retention System 138. As discussed above, these relationships could include multiple CEMs and even multiple OEMs, further complicating the transfer of information among the business partners. Utilizing the invention, all of these business partners can share information by allowing certain privileges to objects and other information stored in database 144. All privileged and confidential information would be safe, since the access data application 714 filters all information going from objects to any guest user and does not allow access to groups of information by those without the proper privileges.

Figure 8:
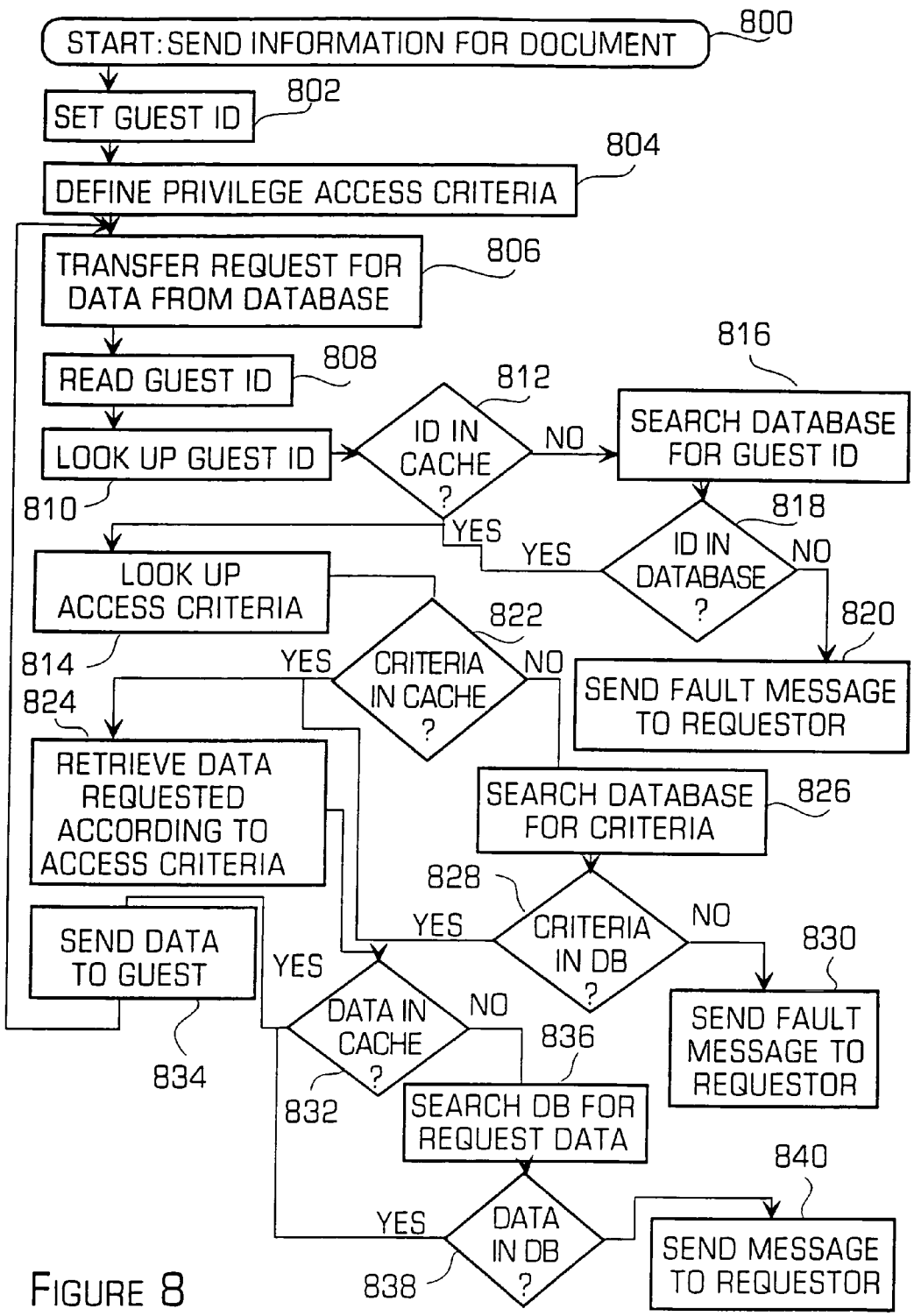
FIG. 8 is a flow diagram illustrating a method in accordance with the invention.

Referring to FIG. 8, a flow diagram is illustrated to further understand the function of the information retention system. First, before the system can be utilized, an object and other associated information must be established with the information retention system by a host. The host starts at step 800 by accessing the data retention system, establishing an object and related documents and sending information. Once an object and other associated information is established, the host may Set the Guest ID 802. Here, the host defines which guest users are allowed to access an object and other associated information. In the next step 804, the host must define the privilege access criteria. As discussed above, here is where the host defines the privileges that give a guest access to particular portions of the object and related information. This step also defines whether and to what extent a guest may read and modify an object and other associated information owned by the host.

Once the object is set up and the guest privileges and other criteria are established, the system is ready for use by a guest. In the next step 806, a transfer request for data from the database is sent by a guest user to the information retention system. In step 808, the retention system reads the guest ID that is sent with the request. In step 810, the data retention system looks up the guest ID to determine whether the guest has been identified by the host to access the object. First, the system searches the cache memory to determine whether or not the guest ID has been stored there in step 812. An ID would be stored in the cache, for example, in the event that a guest has previously and frequently sent requests for this object. Storing the ID in the cache streamlines the process. If the ID is in the cache, then the process proceeds to step 814 to look up the access criteria, which defines the extent to which a guest can access an object and other associated information and modify. If the ID is not in the cache, step 812 proceeds to step 816 to search the database for a guest ID. Then there is a query in step 818 by the server to search for the ID in the database. If the ID is not in the database, then a fault message is sent in 820 to the user making the request, ending the process. If the ID is in the database, then the process proceeds to the lookup access criteria step 814.

The access criteria may be searched in the retention system similar to the manner that the ID is investigated. First, the cache is searched in step 822. If the criteria is found, the process proceeds to step 824 to retrieve the data requested by the guest user. If, however, the criteria is not found in the cache, the database is searched in step 826. If the criteria is not found in the database in step 828, then, again, a fault message is sent to the requester in step 830. If the criteria is found in the database, then the process proceeds to step 824 to retrieve the data requested according to the guest user's access criteria. Then, the data is searched in a similar manner. In step 832, the data is searched for in the cache. If the data is found, then the data is sent to the guest user in step 834 according to the access criteria defined by the host. If the data is not found, then the database is searched in step 836 for the requested data. If the data is not found in the database at step 838, then a message is sent to the requester indicating that the data was not found. If it is found, then the data is sent to the requester, the guest user, according to the access criteria established in the database. Once a request is completed, then the guest user can send another request back at step 806.

In another embodiment, the invention functions in substantially the same manner as described and as illustrated in FIG. 8, but order in which the user ID, the privilege criteria and the object data is searched for is slightly different. In this second embodiment, the data is fetched before the criteria is retrieved. In essence, the procedure of FIG. 8 is modified where step 822 and its loop is switched with step 832 and its loop. Therefore, the data in the cache as in step 832 is checked and verified, and then the criteria in the cache as in step 822 is checked and applied to the data. The filtering procedure is then performed to give the guest user access according to the predetermined privileges and a limited privilege is established, including access to the data strictly according to the preset privileges.

The procedures described in connection with FIG. 8 are performed by executing software code that is made up of electronic or digital forms of data. The code is executable by a CPU performing the device's functions to accomplish the creation of an object and other associated information in accordance with the invention. The creation of the code and the routines developed to enable the CPU to perform the tasks are done using methods well known to those skilled in the art.

Figure 9:
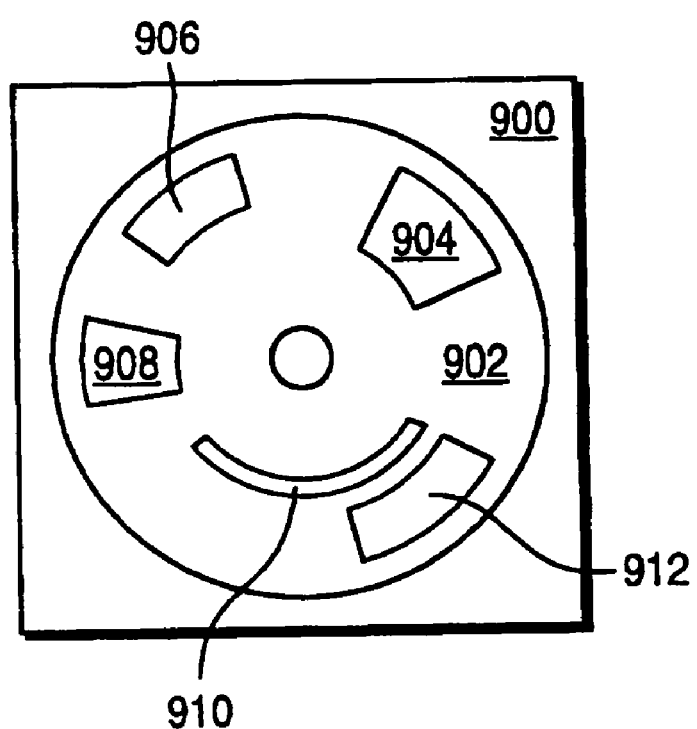
FIG. 9 is a sample of a disk drive whereon digital data such as software is stored.

FIG. 9 illustrates the a preferred structure of such instructions as embodied in a computer program. Those skilled in the art will appreciate that FIG. 9 illustrates preferred structures of the computer program code elements that function according to this invention. Preferably, the invention is practiced in its preferred embodiment by a machine component that renders the computer program code elements in a form that instructs a digital processing apparatus (i.e., a computer) to perform a sequence of functional steps corresponding to those shown in the Figures. The machine component is shown diagrammatically in FIG. 9 as a combination of program code elements in computer readable form that are embodied in a computer-usable data medium 602 such as a computer diskette 600. As mentioned above, however, such media may also be found in semiconductor devices, on magnetic tape and on optical disks.

Each of the code elements 604-612 may be program means for directing a digital processing apparatus to facilitate some portion of the method by which this invention is practiced. Even when no single code element 604-612 includes the complete method, two or more of the code elements together may comprise all of the program means necessary to facilitate the practice of the invention.

The invention is intended as and information retention system for use by multiple users of the network system. The system allows multiple access to a particular document established by a host user, but allows a host user to control the access of the document by guest users according to specific privileges. These privileges can include the ability to read information contained in an object and to possibly redact sections so that a guest user cannot read all of the data contained therein. The privileges can further allow a guest user to modify an object and other associated information by adding or deleting information, again, according to the privileges established by the host. Although this embodiment is described and illustrated in the context of a product development business relationship, the scope of the invention extends to other applications where convenient and efficient document access is required. The use of documents such as bills of material (BOMs), change orders, purchase orders and other business documents could be streamlined and even obviated using such a system. Furthermore, while the foregoing description has been with reference to particular embodiments of the invention, it will be appreciated that these are only illustrative of the invention and the changes may be made to those embodiments without departing from the principles of invention, the scope of which is defined by the appended claims.

The invention claimed is:

1. A system for sharing data among a plurality of business entities involved in a product supply chain, the system comprising:

a storage component configured to store a plurality of data objects pertaining to a product, wherein each stored data object includes a plurality of predefined data groups, and wherein the plurality of stored data objects are maintained by a manufacturer of the product; and a processing component in communication with the storage component, the processing component being configured to:

receive, from a user affiliated with a first supplier, a request to access a data object in the plurality of stored data objects, wherein the data object is owned by a second supplier, and the first supplier supplies to the manufacturer a first component for the product;

extract from the received request a user identifier that uniquely identifies the user;

retrieve a set of privileges associated with the data object and the extracted user identifier, the retrieved set of privileges including read privileges identifying one or more predefined data groups of the data object that the user is allowed to view;

determine, based on the read privileges, one or more predefined data groups of the data object that the user is not allowed to view;

generate a redacted version of the data object, wherein the redacted version of the data object does not include the determined one or more predefined data groups of the data object that the user is not allowed to view; and transmit the redacted version of the data object to the user, wherein the retrieved set of privileges are defined by the manufacturer based on a business agreement between the manufacturer and the second supplier distinct from the first supplier, wherein the second supplier supplies to the manufacturer a second component for the product, and wherein the business agreement indicates that the first supplier should not have access to the one or more predefined data groups of the data object that the user is not allowed to view and that is sensitive to the second supplier.

2. The system of claim 1, wherein the plurality of predefined data groups further include a group of attributes of the data object and a group of documents associated with the data object.

3. The system of claim 2, wherein the plurality of predefined data groups include a group of links to other data objects in the plurality of data objects.

4. The system of claim 1, wherein the data object includes data selected from a group consisting of: product design data, product development data, product supply chain data, business relationship data, business agreement data, bill of material data, change order data, product cost data, product specifications data, and product supplier data.

5. The system of claim 1, wherein the set of privileges includes write privileges identifying one or more predefined data groups of the data object that the user is allowed to modify.

6. The system of claim 1, wherein the set of privileges includes delete privileges identifying one or more predefined data groups of the data object that the user is allowed to delete.

7. The system of claim 1, wherein the set of privileges includes a privilege that allows the user to add new data groups to the data object.

8. A method for sharing data among a plurality of business entities involved in a product supply chain, the method comprising:
    storing, by a computer system, a plurality of data objects pertaining to a product, wherein each stored data object includes a plurality of predefined data groups, and wherein the plurality of stored data objects are maintained by a manufacturer of the product;
    receiving, by the computer system, a request to access a data object in the plurality of stored data objects from a user affiliated with a first supplier, wherein the data object is owned by a second supplier, and the first supplier supplies to the manufacturer a first component for the product;
    extracting, by the computer system, a user identifier that uniquely identifies the user from the received request;
    retrieving, by the computer system, a set of privileges associated with the data object and the extracted user identifier, the retrieved set of privileges including read privileges identifying one or more predefined data groups of the data object that the user is allowed to view;
    determining, by the computer system, one or more predefined data groups of the data object that the user is not allowed to view based on the read privileges;
    generating, by the computer system, a redacted version of the data object, wherein the redacted version of the data object does not include the determined one or more predefined data groups of the data object that the user is not allowed to view; and
    transmitting, by the computer system, the redacted version of the data object to the user,
    wherein the retrieved set of privileges are defined by the manufacturer based on a business agreement between the manufacturer and the second supplier distinct from the first supplier, wherein the second supplier supplies to the manufacturer a second component for the product, and wherein the business agreement indicates that the first supplier should not have access to the one or more predefined data groups of the data object that the user is not allowed to view and that is sensitive to the second supplier.

9. The method of claim 8, wherein the plurality of predefined data groups include a group of attributes of the data object and a group of documents associated with the data object.

10. The method of claim 9, wherein the plurality of predefined data groups further include a group of links to other data objects in the plurality of data objects.

11. The method of claim 8, wherein the data object includes data selected from a group consisting of: product design data, product development data, product supply chain data, business relationship data, business agreement data, bill of material data, change order data, product cost data, product specifications data, and product supplier data.

12. The method of claim 8, wherein the set of privileges includes write privileges identifying one or more predefined data groups of the data object that the user is allowed to modify.

13. The method of claim 8, wherein the set of privileges includes delete privileges identifying one or more predefined data groups of the data object that the user is allowed to delete.

14. The method of claim 8, wherein the set of privileges includes a privilege that allows the user to add new data groups to the data object.

15. A machine-readable medium having stored thereon a series of instructions which, when executed by a processing component, cause the processing component to facilitate the sharing of data among a plurality of business entities involved in a product supply chain by:
    storing a plurality of data objects pertaining to a product, wherein each stored data object includes a plurality of predefined data groups, and wherein the plurality of stored data objects are maintained by a manufacturer of the product;
    receiving, from a user affiliated with a first supplier, a request to access a data object in the plurality of stored data objects, wherein the data object is owned by a second supplier, and the first supplier supplies to the manufacturer a first component for the product;
    extracting from the received request a user identifier that uniquely identifies the user;
    retrieving a set of privileges associated with the data object and the extracted user identifier, the retrieved set of privileges including read privileges identifying one or more predefined data groups of the data object that the user is allowed to view;
    determining, based on the read privileges, one or more predefined data groups of the data object that the user is not allowed to view;
    generating a redacted version of the data object, wherein the redacted version of the data object does not include the determined one or more predefined data groups of the data object that the user is not allowed to view; and
    transmitting the redacted version of the data object to the user,
    wherein the retrieved set of privileges are defined by the manufacturer based on a business agreement between the manufacturer and the second supplier distinct from the first supplier, wherein the second supplier supplies to the manufacturer a second component for the product, and wherein the business agreement indicates that the first supplier should not have access to the one or more predefined data groups of the data object that the user is not allowed to view and that is sensitive to the second supplier.

16. The machine-readable medium of claim 15, wherein the plurality of predefined data groups include a group of attributes of the data object and a group of documents associated with the data object.

17. The machine-readable medium of claim 16, wherein the plurality of predefined data groups further include a group of links to other data objects in the plurality of data objects.

18. The machine-readable medium of claim 15, wherein the data object includes data selected from a group consisting of: product design data, product development data, product supply chain data, business relationship data, business agreement data, bill of material data, change order data, product cost data, product specifications data, and product supplier data.

19. The machine-readable medium of claim 15, wherein the set of privileges includes write privileges identifying one or more predefined data groups of the data object that the user is allowed to modify.

20. The machine-readable medium of claim 15, wherein the set of privileges includes delete privileges identifying one or more predefined data groups of the data object that the user is allowed to delete.

21. The machine-readable medium of claim 15, wherein the set of privileges includes a privilege that allows the user to add new data groups to the data object.

* * * * *

UNITED STATES PATENT AND TRADEMARK OFFICE
CERTIFICATE OF CORRECTION

| | | |
|---|---|---|
| PATENT NO. | : 7,634,455 B1 | Page 1 of 1 |
| APPLICATION NO. | : 09/401251 | |
| DATED | : December 15, 2009 | |
| INVENTOR(S) | : Catherine M. Keene et al. | |

It is certified that error appears in the above-identified patent and that said Letters Patent is hereby corrected as shown below:

In column 12, line 13, delete "show" and insert -- shown --, therefor.

Signed and Sealed this

Fourteenth Day of September, 2010

David J. Kappos
*Director of the United States Patent and Trademark Office*